United States Patent [19]

Van der Valk

[11] 4,278,994

[45] Jul. 14, 1981

[54] CIRCUIT ARRANGEMENT IN A COLOR TELEVISION ENCODER

[75] Inventor: Nicolaas J. L. Van der Valk, Breda, Netherlands

[73] Assignee: U.S. Philips Corporation, New York, N.Y.

[21] Appl. No.: 75,048

[22] Filed: Sep. 12, 1979

[30] Foreign Application Priority Data

May 28, 1979 [NL] Netherlands ............... 7904157

[51] Int. Cl.$^3$ ............................................. H04N 9/44
[52] U.S. Cl. ....................................... 358/25; 358/148; 358/158
[58] Field of Search ............... 358/17, 25, 148, 158, 358/24

[56] References Cited

U.S. PATENT DOCUMENTS

| | | | |
|---|---|---|---|
| 3,571,513 | 3/1971 | Ward | 358/17 |
| 3,646,362 | 2/1972 | Limberg | 358/17 |
| 3,733,432 | 5/1973 | Arimura | 358/17 |
| 3,739,081 | 6/1973 | Roth | 358/25 |
| 3,904,823 | 9/1975 | Van Straaten | 358/158 |
| 4,024,343 | 5/1977 | Cense | 358/158 |

OTHER PUBLICATIONS

Ebo Review, nr. 172, Dec. 1978, p. 265–281, "Disturbances Occurring at Edits on Pal 625-Line Video Tapes".

Primary Examiner—Robert L. Griffin
Assistant Examiner—Michael A. Masinick
Attorney, Agent, or Firm—Thomas A. Briody; William J. Streeter; Edward W. Goodman

[57] ABSTRACT

A circuit arrangement in a color television encoder comprising a first oscillator for generating a chrominance subcarrier signal, a second oscillator for generating a signal having the line frequency or a multiple thereof and a phase control loop for readjusting the phase of one of the said oscillators and including a sample and hold circuit operative every $2n^{th}$ line and at a given instant in the line period, n being an integer. As a result thereof the phase between the two signals is fixed.

7 Claims, 2 Drawing Figures

CIRCUIT ARRANGEMENT IN A COLOR TELEVISION ENCODER

BACKGROUND OF THE INVENTION

The invention relates to a circuit arrangement in a color television encoder, comprising a first oscillator for generating a chrominance subcarrier signal, a second oscillator for generating a signal having the line frequency or a multiple thereof, signals of field frequency being derived from this signal, and a mixer circuit for coupling the frequency of the chrominance subcarrier and the line frequency.

In such a circuit arrangement the frequencies of the two signals generated by the two oscillators are coupled to one another so that one frequency is higher than the other frequency by a given factor, this factor having a prescribed value in the relevant color television standard. The chrominance subcarrier has also a fixed phase relationship during consecutive line periods. For the NTSC standard the above-mentioned factor is chosen such that the phase of the unmodulated chrominance subcarrier is subjected to a 180° variation between a given instant in a line period and the corresponding instant in the next line period. However, there is no prescribed phase relationship between the chrominance subcarrier and the signal of the line frequency.

An article in the publication "E.B.U. Review-Technical No. 172, December 1978, pages 265-281 describes a number of distrubances which may occur when color television pictures, in accordance with the PAL standard, are recorded, which disturbances are caused by the fact that the PAL video signal has an eight-field structure, that is to say with a repetition rate of 6.25 Hz (in Europe). The article advocates the desirability of eliminating these disturbances by means of a stable phase relationship between the two signals, the phase being defined as the phase of the $-E_u'$ component of the color burst in the center of the leading edge of the preceding line synchronizing pulse, this component being obtained by means of extrapolation, and $E_u'$, indicating, as known, one of the quardrature modulation directions. While the above-mentioned article indeed only relates to the European PAL standard, it will, however, be obvious that similar disturbances may occur when colour television pictures in accordance with other variants of this standard, and also in the case of the NTSC standard, are recorded.

Such a phase relationship can be obtained by means of adjustable phase shifting networks, which networks must be so stable that no shift can occur anymore between the burst and the synchronizing signal when they arrive at the input of the pick-up device. It is, however, difficult to realize such networks, whereas the phase of the two signals must be very stable with respect to temperature effects. In addition, the phase is not unambiguously determined on switch-on.

SUMMARY OF THE INVENTION

According to the invention a circuit arrangement of the type defined in the opening paragraph is characterized in that a sample-and-hold circuit, which is operative every $2n^{th}$ line at a given instant in the line period, n being an integer, is included in a phase control loop for readjusting the phase of one of the oscillators.

DESCRIPTION OF THE DRAWINGS

The invention will now be further explained by way of non-limitative example with reference to the accompanying Figures, wherein.

DESCRIPTION OF THE PREFERRED EMBODIMENT

Figure 1:
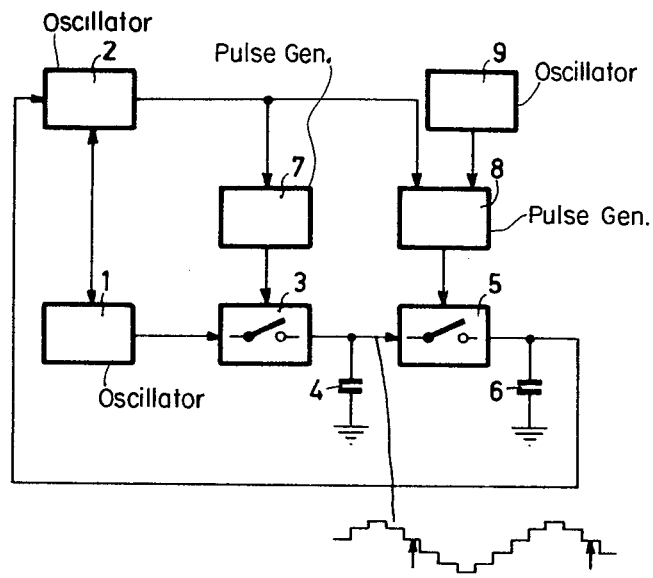
FIG. 1 shows in block diagram form an embodiment of the circuit arrangement according to the invention and FIG. 2 shows the circuit arrangement in greater detail.

In FIG. 1 reference 1 is an oscillator which generates a signal having the frequency $f_{SC}$ of the chrominance subcarrier and reference numeral 2 denotes another oscillator which generates a signal having the line frequency $f_H$. These oscillators 1,2 form part of a circuit arrangement which is suitable for the following standards:

NTSC where $f_{SC}$=3.579545 MHz and $f_H$=15.734265 kHz

PAL where $f_{SC}$=4.43361875 MHz and $f_H$=15.625 kHz

PAL-M where $f_{SC}$=3.57561149 MHz and $f_H$=15.734265 kHz

PAL-N where $f_{SC}$=3.5820625 MHz and $f_{HH}$=15.625 kHz

The NTSC standard is inter alia used in the United States of America, while the PAL standard is used in a number of West European countries. The PAL-M and PAL-N standards are prescribed in some South American countries, such as Brasil and the Argentines, respectively.

The double arrow in FIG. 1 indicates that the oscillators 1 and 2 are coupled to one another a known manner to maintain a fixed relationship between the frequencies $f_{SC}$ and $f_H$, it being apparent from the numbers shown above that:

$$f_{SC} = 227.5 f_H \quad \text{for NTSC}$$
$$f_{SC} = (283.75 + \tfrac{1}{625}) f_H \text{ for PAL}$$
$$f_{SC} = 227.25 f_H \quad \text{for PAL-M}$$
$$f_{SC} = (229.25 + \tfrac{1}{625}) f_H \text{ for PAL-N}$$

Herein the term 1/625 corresponds to 25 Hz, this being the frame frequency or half the 50 HZ field frequency, in the relevant standard.

The chrominance subcarrier signal is applied to a first sample and hold circuit comprising a switch 3 and a capacitor 4. A d.c. voltage is obtained across a capacitor 6 by means of a second sample-and-fold circuit comprising a switch 5 and the capacitor 6, and is applied to the oscillator 2 for adjusting the phase thereof.

By means of a signal originating from the oscillator 2, a pulse generator 7 generates a switching signal for the first sample-and-hold circuit 3,4 in response to which switch 3 conducts for a short period of time after a reference instant in a line period. The voltage across the capacitor 4 assumes the value of the voltage of oscillator 1 during this period of time and retains this value until the next sampling instant. The instant at which the leading edge of a line synchronizing pulse reaches half the amplitude thereof, is chosen as the reference instant, while the sampling time is very short, i.e. approximately 10 ns, relative to the period of the subcarrier signal, i.e. approximately 279 or 225 ns.

In view of the choice of the factor between the frequencies $f_{SC}$ and $f_H$, sampling by means of switch 3 cannot be effected in every line. Since, as known, a phase shift, namely a 180° shift in the case of NTSC and a shift of approximately 90° in the case of PAL, occurs between the chrominance subcarrier at a given instant and the same subcarrier at the corresponding instant in the next line period. For this reason the switching signal supplied by generator 7 has a repetition rate of $f_H/2$ in the case of NTSC, and of $f_H/4$ in the case in the case of PAL. The voltage across capacitor 4, whose value depends on the phase of the chrominance subcarrier at the sampling instant and is, consequently, a measure of the phase to be adjusted, is a d.c. voltage in the synchronized state of the phase control loop of FIG. 1 in the case of the standards without the 25 Hz offset, that is, in the NTSC and the PAL-M standards. In the other two standards, namely PAL and PAL-N, this voltage has a frequency of 25 Hz, this voltage being shown in FIG. 1 in a simplified form. It consists of steps having a length of 4 line periods and is of a more or less sinusoidal shape.

The signal from oscillator 2 is also applied to a second pulse generator 8 which also receives a signal of the field frequency generated by an oscillator 9, the field frequency $f_V$ being equal to approximately 60 Hz for the NTSC and PAL-M standards and 50 Hz for the PAL and PAL-N standards, respectively. Frequency $f_V$ may alternatively be derived in known manner from frequency $f_H$, for example by means of divider circuits. The output signal of generator 8 has a repetition rate of $f_V/2$ and contains a pulse which renders switch 5 conductive during a period of time, for example one line time which is short relative to the period and which is shorter than the length of a step of the voltage across capacitor 4. During this period of time, there is produced across capacitor 6 a voltage which is equal to the voltage present across capacitor 4 during this same line time. Since each frame consists of two fields, this line is invariably a certain line of a certain field, for example the even field. This line is indicated in FIG. 1 by means of an arrow. The control voltage obtained across capacitor 6 is a d.c. voltage for all four standards, for NTSC and PAL-M as the voltage across capacitors 6 is already a d.c. voltage so that the sampling rate is of no importance and for PAL and PAL-N as the values of the voltage across capacitor 4 are equal to one another for two consecutive arrows.

By making the interval between the above-mentioned reference instant and the sampling instant of the first sample-and-hold circuit 3,4 adjustable, it is possible to adjust the voltage across capacitor 4 for the indicated line and, consequently, also the control voltage applied to oscillator 2. In this way the phase relationship between the signal of the line frequency and the chrominance subcarrier has been made adjustable. If this relationship changes, for example because of a variation in the temperature, the voltage across capacitor 4 varies. This voltage variation is super-imposed on the d.c. voltage, or the voltage having a frequency of 25 Hz which would be present across capacitor 4 in the case there is no variation, so that sampling with a frequency equal to $f_V/2$ or equal to a multiple thereof, provided this multiple is not too great, is suitable to produce a corresponding variation in the control voltage. In response thereto, the phase of the signal generated by oscillator 2 varies, namely until this variation becomes substantially equal to zero.

It will be noted that sampling by means of the first sample-and-hold circuit 3,4 need not be effected every second line for the NTSC standard, but that the same switching signal as used for the PAL standard can be used, so that sampling may be effected every fourth line for both standards, seeing that the phase of the chrominance subcarrier for the NTSC standard is the same at corresponding instants of every second line time and, consequently, also of every fourth line time, at least if there is no drift in such a short interval. Generally, it can be sampled every $2n^{th}$ line for NTSC and every $4n^{th}$ line for PAL, n being any arbitrary integer. It will be apparent that a highest possible sampling rate will add to its proper operation, so that n should not be too great. Alternatively, it should be noted that, strictly speaking, the second sampling operation is not necessary for the NTSC standard but may be maintained to render the present circuit universally applicable.

Figure 2:
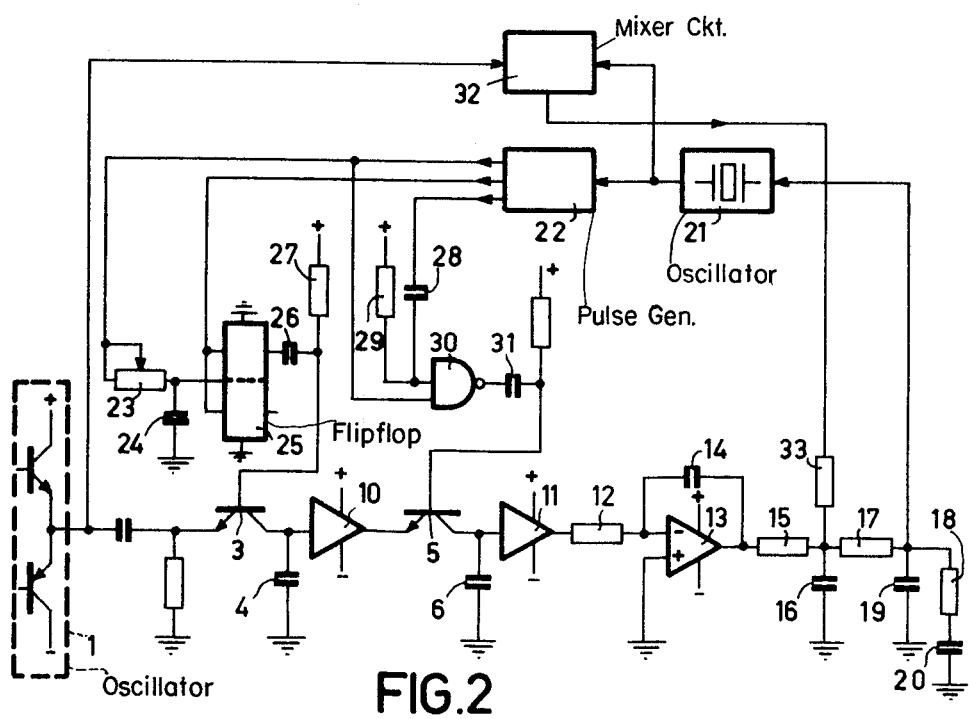

In FIG. 2, wherein corresponding parts are given the same reference numerals as in FIG. 1, the chrominance subcarrier which is generated by a crytal oscillator (not shown) at frequency $f_{SC}$ or a multiple thereof is taken from an output amplifier of oscillator 1 and applied to the emitter of a switching transistor, this transistor being bipolar and operating as switch 3. Capacitor 4 is included in the collector lead of transistor 3. Via a buffer stage 10 this collector is connected to the emitter of a switching bipolar transistor operating as switch 5, capacitor 6 being included in the collector lead of this transistor. Via a buffer stage 11 and a resistor 12, this collector is connected to the inverting input terminal of a differential amplifier 13 whose non-inverting input terminal is connected to ground and whose output terminal is connected to the inverting input terminal via a capacitor 14 and to a capacitor 16 via a resistor 15. From this it is apparent that the voltage of stage 11 is smoothed by integrator 12, 13, 14 and by network 15, 16. Additional smoothing is effected by means of a filter consisting of two resistors 17 and 18 and two capacitors 19 and 20, elements 17, 18, 19 and 20 being connected as shown in FIG. 2. The a.c. voltage present across capacitor 19 is a control voltage which is applied to a crystal oscillator 21 for adjusting the phase thereof. To this end oscillators 21 comprises a variable capacitance diode the capacitance of which can vary in response to a d.c. voltage.

Since the non-inverting terminal of amplifier 13 is connected to ground, the control voltage is substantially zero in the nominal state of the control loop. The frequency of the signal from oscillator 21 is then equal to 160 times the frequency $f_H$. This signal is applied as clock signal to a pulse generator 22, which generates pulses of the line and of the field frequency for the different standards and which consequently comprises the oscillators 2 and 9 of FIG. 1. Pulses of the line frequency are integrated by means of a resistor 23 and a capacitor 24, whereafter they are applied to the clock input terminal of a flipflop 25, the J- and K-input terminals of which are supplied with a signal orginating from generator 22 which is either a d.c. voltage signal for the case of NTSC standard or a square-wave signal of the frequency $f_H/2$ for the case of the PAL standard and which is necessary to enable identification in the last-mentioned standard. The signal at one of the output terminals 8 of flipflop 25 is differentiated by means of a capacitor 26 and a resistor 27 and the signal obtained is applied to the base of transistor 3. This renders transistor 3 conductive each time for approximately 10 ns, whereas the repetition rate is $f_H/2$ for NTSC and $f_H/2$ for PAL. Resistor 23 is adjustable, it being possible to adjust the interval between the reference instant of the signal of the line frequency and the sampling time of the transistor 3 by means of this resistor 23. In FIG. 2 elements 23 to 27, inclusive, have the same function as pulse generator 7 in FIG. 1.

Pulses of the field frequency which are generated by pulse generator 22 are differentiated by a capacitor 28 and a resistor 29 and the resulting signal is applied to an output terminal of a NAND-gate 30 to another input terminal of which pulses of the line frequency are applied. The first-mentioned input signal of gate 30 is a pulse of the field frequency having a duration which is very short relative to the field period and which occurs simultaneously with a line pulse for one field and in-between two line pulses for the subsequent field. So the output signal of gate 30 is a pulse occuring every other field and applied to the base of transistor 5 via a coupling capacitor 31. In FIG. 2 elements 28 to 31, inclusive, have the same function as pulse generator 8 in FIG. 1.

The clock signal generated by oscillator 21 as well as the chrominance subcarrier signal originating from oscillator 1 are applied to a mixer circuit 32. Herein, the frequency of the clock signal is divided in known manner and the signal obtained is compared with the chrominance subcarrier signal. This results in a control voltage which, after smoothing, can be applied to oscillator 21 for controlling the frequency thereof, the coupling between the chrominance subcarrier frequency and the line frequency being effected thus. In the embodiment of FIG. 2 this smoothing is effected by means of the same network which caters for smoothing in the above-described phase control loop. A resistor 33 is included for this purpose between the suitable output terminal of mixer circuit 32 and capacitor 16.

During operation, a control voltage, which is the sum of the control voltage for the frequency coupling and the control voltage for the phase relationship is present across capacitor 19. It will be apparent that these two controls should influence one another to the least possible extent. This is achieved because of the fact that the time constant of elements 12, 13, 14, 15 and 16 is much greater, at least a hundred times greater, than the time constant of the network formed by resistor 33 and capacitor 16. The control voltage for the phase control is much lower and varies more slowly than the control voltage for the frequency coupling. Too rapid a variation of the control voltage for the phase control would be processed by the frequency control loop as being produced by a frequency change, which would result in too great a correction of the frequency in the rhythm of the second sampling. It will be apparent that within the scope of the invention the two controls may also be separate from one another. Alternatively, it is possible to have one control act, for example, on oscillator 21, whereas the other control acts on source 1. As, however, the chrominance subcarrier oscillator must have a very high stability, preference should be given to a circuit in which, as mentioned above, only the line frequency or a multiple thereof is controlled.

The circuit arrangement according to the invention effects an adjustable phase lock between the chrominance subcarrier and the signal of line frequency, both for the NTSC and for the different PAL standards. Although the necessity of such a phase lock for the SECAM standard has not been demonstrated, it will be apparent that the circuit according to the invention can also be used without any drawback for this standard, so that it can be incorporated in an encoder which is suitable for all color television standards.

What is claimed is:

1. A circuit arrangement in a color television encoder, comprising a first oscillator for generating a chrominance subcarrier signal and a second oscillator for generating a signal having the line frequency or a multiple thereof, wherein one of said oscillators is adjustable, said circuit arrangement further comprising a frequency control loop which includes the adjustable one of said oscillators and a mixer circuit coupled to the outputs of said first and second oscillators for generating a frequency control signal for the adjustable one of said oscillators, characterized in that said circuit arrangement further comprises a phase control loop, also coupled to the adjustable one of said oscillators, which includes a first sample-and-hold circuit for providing a phase control signal for the adjustable one of said oscillators.

2. A circuit arrangement as claimed in claim 1 characterized in that said first sample-and-hold circuit is made operative every $2N^{th}$ line, N being an integer, and at a specified instant in the period of the relevant line.

3. A circuit arrangement as claimed in claim 2, characterized in that the sampling instant of said first sample-and-hold circuit is adjustable relative to a reference instant in the line period.

4. A circuit arrangement as claimed in claim 2, characterized in that the phase control loop readjusts the phase of the signal generated by second oscillator.

5. A circuit arrangement as claimed in claim 2, characterized in that the phase control loop further comprises a second sample-and-hold-circuit which is operative every $2m^{th}$ field, m being an integer, and is connected to the first sample-and hold circuit.

6. A circuit arrangement as claimed in claim 2, wherein said frequency control loop further comprises a first smoothing filter, said frequency control signal being present on this first filter, and wherein said phrase control loop further comprises a second smoothing filter connected to the first smoothing filter, there being present on this second filter the phase control signal which is then added to the frequency control signal, the time constant of the second smoothing filter being many times greater than the time constant of the first smoothing filter.

7. A circuit arrangement as claimed in claim 2 for generating signals in accordance with the PAL color television standard, characterized in that the number N is an even number.

* * * * *